United States Patent [19]

Floyd et al.

[11] Patent Number: 4,578,591

[45] Date of Patent: Mar. 25, 1986

[54] CONTROL CIRCUIT FOR AUTOMOTIVE ACCESSORY SYSTEM

[75] Inventors: William M. Floyd, Livonia; David L. Juzswik, Dearborn Heights, both of Mich.

[73] Assignee: United Technologies Automotive, Inc., Dearborn, Mich.

[21] Appl. No.: 664,804

[22] Filed: Oct. 25, 1984

[51] Int. Cl.⁴ .............................................. H02J 1/00
[52] U.S. Cl. .............................. 307/10 R; 307/10 LS; 307/38; 364/424; 340/825.57; 370/92
[58] Field of Search ................... 307/10 R, 10 LS, 38, 307/40, 41; 364/424; 340/825.13, 825.57; 370/85, 92

[56] References Cited

U.S. PATENT DOCUMENTS

| | | | |
|---|---|---|---|
| 3,864,578 | 2/1975 | Lackey | 307/10 R |
| 4,306,218 | 12/1981 | Leconte et al. | 307/10 LS X |
| 4,307,301 | 12/1981 | Speidel | 307/10 LS |
| 4,435,648 | 3/1984 | Goode, III | 307/10 LS X |
| 4,481,585 | 11/1984 | Huntzinger et al. | 364/424 |
| 4,492,904 | 1/1985 | Graham | 318/444 |
| 4,528,662 | 7/1985 | Floyd et al. | 370/92 |
| 4,532,432 | 7/1985 | Mizuno et al. | 307/10 R |
| 4,538,262 | 8/1985 | Sinniger et al. | 370/85 |

Primary Examiner—A. D. Pellinen
Assistant Examiner—Derek S. Jennings
Attorney, Agent, or Firm—Stephen A. Schneeberger

[57] ABSTRACT

A control circuit is provided for selectively determining multiple modes of operation for one or more electrical loads in an automotive accessory system. For a particular load, the circuit includes a switch and a microcomputer signal processing unit. The switch is typically of the momentary-action, dry type which provides a signal only so long as an actuating force is applied. The microcomputer repetitively, at brief intervals determines the presence or absence of such a signal indicative of switch actuation and further is responsive to either brief "momentary" actuation of the switch to effect a primary mode of load control or to a longer "dwell" actuation to effect a secondary mode of load control. The secondary mode of load control includes a characteristic which is determined as a function of the "dwell" duration. Such characteristics of load control in the second mode include the duration of actuation of directional lane-change lamps, the interval between sweeps of a windshield wiper operating intermittently and/or the intensity or brightness of illumination lamps.

16 Claims, 10 Drawing Figures

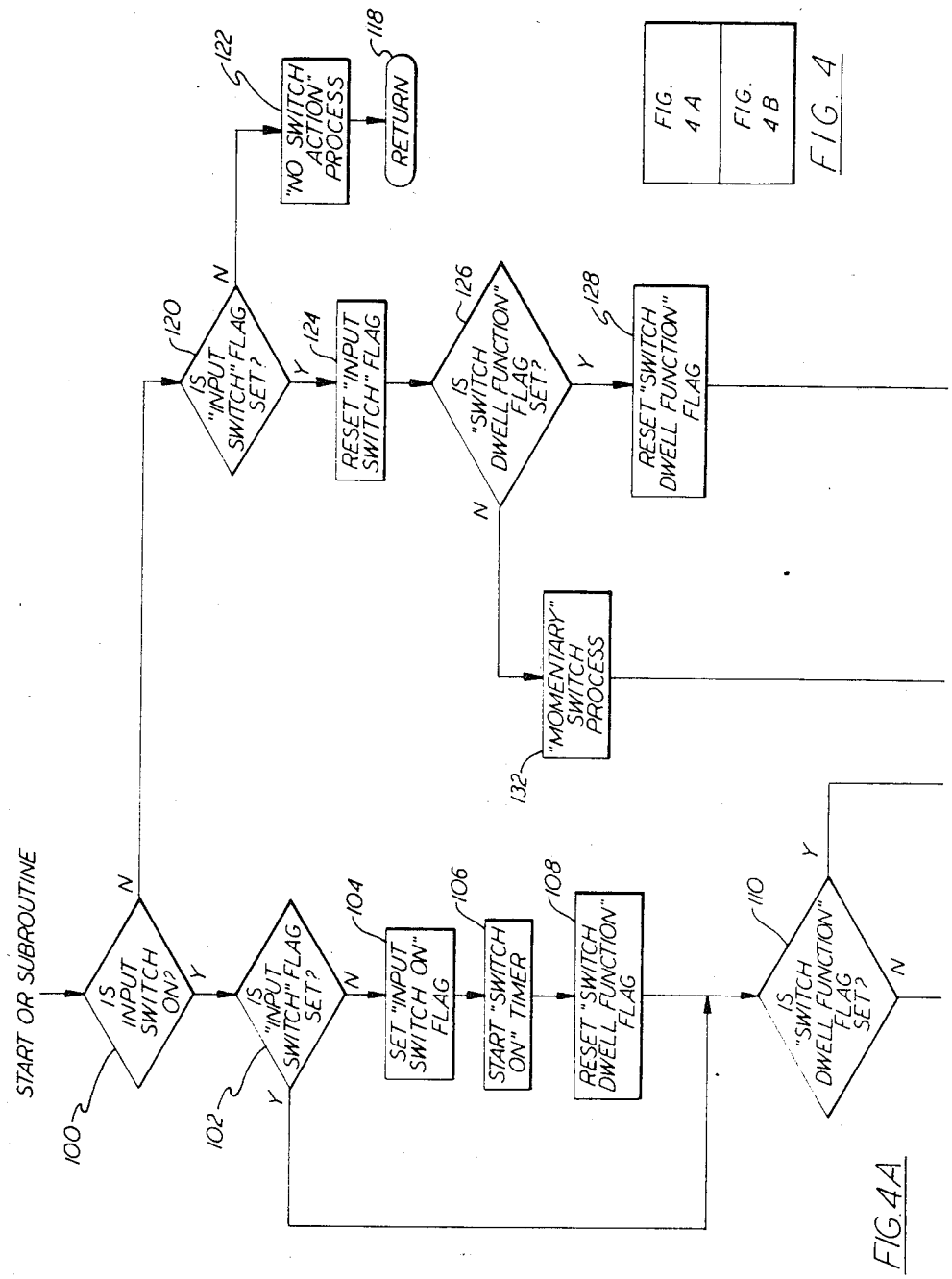

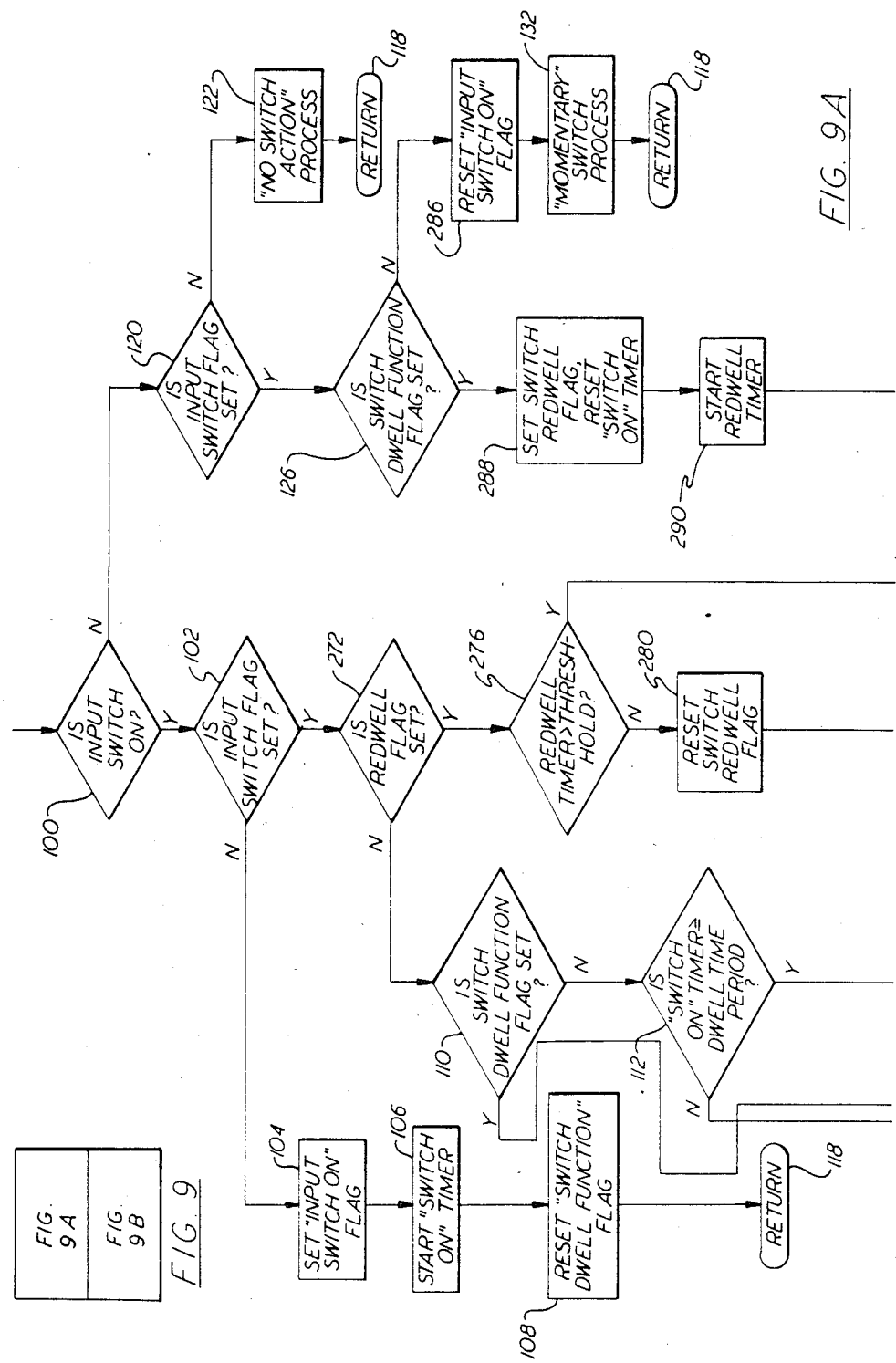

CONTROL CIRCUIT FOR AUTOMOTIVE ACCESSORY SYSTEM

DESCRIPTION

1. Technical Field

The present invention relates to control circuitry and more particularly to control circuitry for an automotive accessory system. More particularly still, the invention relates to improved microcomputer-based control circuitry and the inputs thereto for controlling loads in an automotive accessory system.

2. Background Art

Various electronic circuits have been disclosed for controlling the operation of diverse loads in an automotive accessory system. Such loads typically include windshield wipers, turn indicators, head lamps, instrument panel illumination lamps, and the like. Until recently, each such load has typically required its own separate circuit employing switches of a size and capacity capable of carrying significant currents via lengthy conductors having similar current carrying capacity. More recently, the development of microelectronic control systems has enabled a large number of control circuits to be embodied in a microcomputer or the like. Concomittantly, the current-carrying requirements of much of the control circuitry, including the input switches, may be reduced.

One recent example of such a microcomputer-based control for automotive accessories is disclosed in U.S. Pat. No. 4,435,648 to Goode on Mar. 6, 1984 for "Automotive Accessory Control System". There, several diverse loads are controlled via input control action afforded via several switches and a sensor. One mode of load control concerns adjustment of the brightness of the instrument panel lights and is effected via a dimmer selector. Another mode of load control involves monitoring the interval or period between two successive actuations of a switch and using that interval as the interval between sweeps of a windshield wiper in its intermittent mode. In yet another mode of load control, a delay associated with the activation and deactivation of the headlights is determined by a preset timer switch.

Somewhat earlier, U.S. Pat. No. 4,307,301 by Volker on Dec. 2, 1981 for "Electric Circuit Arrangement For Replacement of An Electric Switch with Combined Pushing and Locking Function for Automotive Vehicles" describes the replacement of a "push and lock"-type switch with a discrete electronic circuit employing an RC timing arrangement for controlling a turn signal or the like. While the embodiment described by Volker might be beneficial in those instances where a separate circuit may be dedicated to a "push and lock"-type function, it is not as well suited for incorporation in a microcomputer-based system nor for establishing and retaining repetitive wiper delay intervals and/or lighting intensities, and the like.

DISCLOSURE OF INVENTION

Accordingly, it is an object of the invention to provide an improved control arrangement for an automotive accessory system. Included in this object is the provision of relatively simple and inexpensive switches utilized in cooperation with a microcomputer-based system for controlling one or more of the loads in an automotive accessory system. Further included in this object is the use of such switches to control inputs in an ergonomically optimized manner.

In accordance with the invention there is provided a control circuit for selectively determining multiple modes of operation for one or more electrical loads in an automotive accessory system. The circuit includes for a particular load, a respective switch, typically of the momentary action type, operatively associated with a signal potential and being responsive to an actuating force to provide a signal indicative of switch actuation only while the actuating force persists. The control circuit further includes a microcomputer for providing output control as a function of its programming and the input variables. The signal indicative of actuation of a respective switch is extended to a corresponding input of the microcomputer. The microcomputer repetitively and at brief intervals determines the presence or absence of an actuation signal of a respective switch and also determines the duration of such actuation signal, while present, relative to a predetermined time threshold. The microcomputer is further operative following a determination that the switch actuation signal is present only for a momentary interval less than the predetermined threshold, to effect control of a respective load in a primary mode and is operative following a determination that the switch actuation signal was present for a dwell interval longer than the predetermined threshold, to effect control of the respective load in a secondary mode. The brief interval at which the presence or absence of the switch actuation signal is determined is typically less than 10 milliseconds. The time threshold for determining a dwell interval then follows by a predetermined interval which is preselected to satisfy ergonomic criteria and is typically in the range of about 500 milliseconds to one second.

The primary mode of load control effects operation of the respective load in alternate ones of predetermined operating states, as for instance, "on-off" or "low-high", or the like. Successive momentary actuations of the switch effect operation of the respective load in alternate ones of the operating states in accordance with a predetermined sequence. In certain applications, upon the initial actuation, control functions can be immediately activated prior to a determination of a primary or a secondary mode of operation. The secondary mode of load control effects operation of the load as a function of the duration of the dwell interval following the time threshold. The primary mode of load control is effected only after the switch actuation signal is determined to be no longer present. On the other hand, while some portion of the secondary mode of load control may be begun upon a determination that the switch actuation interval has exceeded the time threshold, continued operation in the secondary mode of load control may await the termination of the switch actuation signal so as to utilize information developed during the time-dependent dwell interval to effect such operation.

Typically, the accessory system will include plural, functionally diverse loads, as for instance, a windshield wiper motor, turn indicating lamps, instrument panel illumination means and headlights.

Where the load comprises a multi-speed windshield wiper motor, the primary mode of control effected by its associated switch via the microcomputer includes selection of the respective one of the multiple speeds of motor operation. The secondary mode of load control operation comprises the intermittent operation of the wiper motor at selectable sweep intervals, the period of the sweep intervals being determined by and substantially proportional to the duration of the dwell interval of the switch actuation signal following the time threshold and within a predetermined maximum sweep interval limit. The primary mode of load control may provide for selection of low speed wiper motor operation if the wiper motor is in its "off" condition, and for high speed operation if the motor is operating at its "low" speed, and for low speed operation of the motor if it is operating in its "high" speed. A further input switch may be connected to the microcomputer for toggling the wiper motor between its "on" and "off" condition.

Where the load is a lamp provided for illumination, the primary mode of load control includes selection of either an "on" or an "off" condition of the lamp and the secondary mode of control provides for varying the brightness of the lamp as a function of the duration of the dwell interval following the time threshold. In one embodiment, continued dwelling on the input switch may be operative to cyclicly increase and then decrease the lamp brightness. In another embodiment, the secondary mode of load control may be subdivided into two or more successive dwell intervals spaced by only brief intervals and alternately operative to only increase or decrease the light intensity.

BEST MODE FOR CARRYING OUT THE INVENTION

Figure 1:
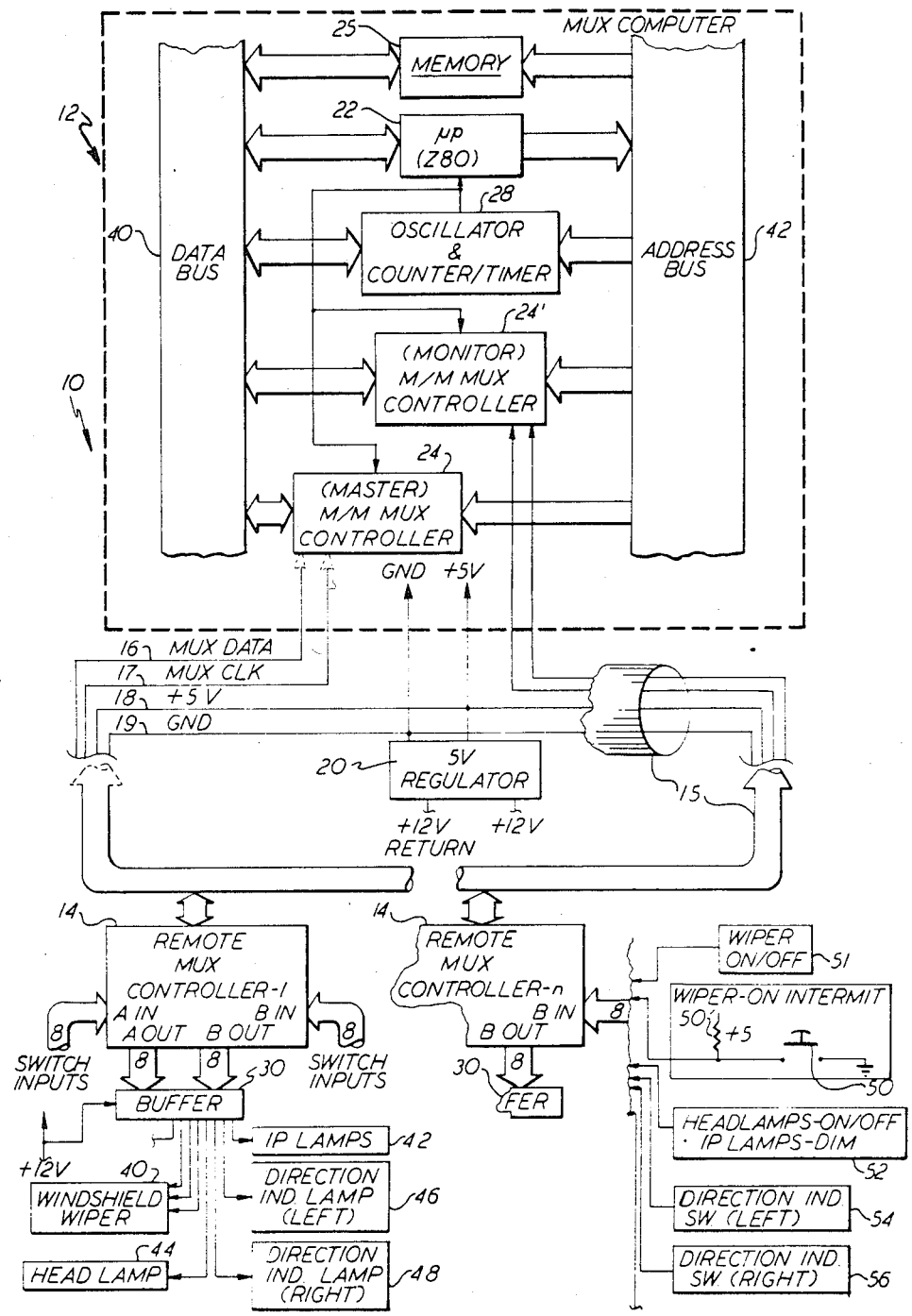
FIG. 1 is an architectural block diagram of a control circuit for an automotive accessory system in accordance with the present invention.

Referring to the Figures and initially to FIG. 1, there is illustrated an architectural block diagram of a multiplex control system 10 for the electrical accessory functions of an automotive vehicle in accordance with the present invention. For brevity, the word "multiplex" will hereinafter be expressed as "Mux" and a remote multiplexer will be referred to as a "Remux". Designations for various signals appearing on various conductors or at various ports in the system will be represented by descriptive abbreviations. The multiplex control system 10 employs a Mux computer 12 located at a central station within an automotive vehicle for providing control to and for interacting with one or more remote multiplex (Remux) controllers 14 positioned at various remote locations about the vehicle. For purposes of the present invention, the Mux computer 12 and the collective Remuxes 14 may be considered collectively to be a microcomputer having a logic capability, a memory capability and counting/timing capability in response to programmed instructions. Communciation between the Mux computer 12 and the Remuxes 14 is afforded via a four-wire bus 15 which includes a first wire 16 for carrying bidirectional, serial, time division multiplexed data, a second wire 17 for conveying the serial 25 KHz multiplex clock MUX CLK, a third wire 18 for, extending a +5 volt DC supply voltage to the Mux computer 12 and the Remuxes 14 and a fourth wire 19 which serves as a signal ground (GND) for the multiplex system 10. The 5 volt supply voltage and the ground may be supplied by and referenced to the conventional 12 volt battery (not shown) of an automotive vehicle via a 5 volt regulator 20. In the illustrated embodiment, the bus 15 is formed as a loop which is terminated at its opposite ends or terminals by differing portions of the Mux computer 12 to provide increased integrity and security to the multiplex control system 10. The multiplex control system 10 is described in greater detail in U.S. Patent Application Ser. No. 540,581 by William M. Floyd et al for "Multiplex Control Systems Having Enhanced Integrity" filed Oct. 7, 1983 and commonly owned with the present application, which application is incorporated herein by reference.

The Mux computer 12 located at the central station includes a standard microprocessor 22 operatively connected with a master Mux controller 24 and a monitor Mux controller 24'. The master Mux 24 controller 24 (Master Mux) and the monitor Mux 24' (Monitor Mux) are each formed of custom LSI CMOS gate array circuitry and are identical in construction but differ somewhat in operation as a function of time and control mode. One end of the loop of multiplex bus 15 is connected to master Mux 24 and the other end is connected to monitor Mux 24'. The microprocessor 22 in the preferred embodiment is a 4 MHz Z80, such as the Mostek 3880, employing NMOS circuitry, but it will be understood that other microprocessors are similarly applicable. A memory 25 is also provided in conjunction with microprocessor 22 in the MUX computer 12, and typically includes a 1K CMOS ramdom access memory and a 4k CMOS programmable read only memory. The Mux computer 12 also includes oscillator and counter/timer circuitry generally represented by the function block 28, for generating the timing signals internal to the multiplex control system. It will be appreciated that via the programmed instructions stored in memory 25, the microprocessor 22 is additionally capable of providing counting and/or timing capabilities for external control purposes as will be hereinafter described in greater detail.

All of the Remuxes 14 connected to the multiplex bus 15 are of similar construction, each being an LSI gate array employing CMOS logic elements. Each Remux controller 14 is provided with significant logic capacity for "intellectual" interaction with the Mux computer 12, and typically includes provision for as many as 16 inputs from various vehicle switches and as many as 16 outputs to various vehicle loads. In the illustrated embodiment of FIG. 1, only two Remux controllers 14 have been illustrated, those being the first and the nth Remuxes. Further still, while each Remux 14 might have most of its input and most of its output ports in use for various switches and loads respectively, the illustration of FIG. 1 has been simplified to depict only a few of the inputs of the nth Remux 14 in use and only a few corresponding outputs in use on the first Remux controller 14. Generally speaking, the inputs to a Remux 14 will typically be occupied by switches and/or sensors which provide input information to the control system 10 and the Remux outputs provide various control signals for controlling the operation of diverse automotive accessory-type loads. Particular examples of such input and output circuits will be described hereinafter in greater detail in accordance with the invention.

The architecture of each Remux 14 is such that it is divided into halves, each half having eight inputs and eight outputs and having a separate address. More specifically, one side of a Remux 14 is designated the A side and is provided with an even numbered address and the other side is designated the B side and is given an odd number address which is numerically 1 greater than the A side address. The outputs from Remuxes 14 to the various vehicle loads typically provide low voltage control signals to various control elements or buffers, generally designated 30, which in turn respond by connecting or disconnecting the vehicle 12 volt supply to the load being controlled.

The control system 10 employs a communications protocol described in U.S. Application Ser. No. 469,591 for "Vehicle Multiplex System Having Protocol/Format For Secure Communication Transactions" filed Feb. 24, 1983 by William M. Floyd and assigned to the same assignee as the present application, which description is incorporated herein by reference. Briefly, each communication transaction on the Mux data line 16 of multiplex bus 15 includes seven characters or bytes of eight bits each, the first byte being a sync byte, the following three bytes comprising a command message from the master controller 24 consisting of an address byte, a command byte and a CRC error detect byte and the final three bytes comprising a reply message from a Remux 14 consisting of an address byte, a response byte and a CRC error detect byte.

Referring now to the inventive aspects of the control system 10 in greater detail, FIG. 1 illustrates several particular accessory-type loads connected to the output buffer 30 of the initial Remux 14 and the corresponding input switches for those loads being connected to respective input ports on the nth Remux 14. More specifically, the accessory devices or loads include a two-speed windshield wiper motor 40, one or more instrument panel lights 42, headlights 44, one or more left turn indicating lamps 46, and one or more right turn indicating lamps 48. The corresponding input switches include switches 50 and 51 for controlling operation of windshield wiper 40, switch 52 for controlling the instrument lights 42 and possibly also the headlights 44, switch 54 for controlling the left turn lamp 46 and switch 56 for controlling the right turn lamp 48.

Each of the switches 50, 51, 52, 54 and 56 is of the single pole, single throw momentary contact type in which closure of a pair of contacts to provide a conductive path exists only as long as an actuating force is applied to the switch. When the actuating force is released, the circuit returns to its opposite or rest state. Referring to windshield wiper switch 50, it will be noted that one terminal of the switch is connected to ground (Logic 0) and the other terminal is connected through a resistor 50' to a positive voltage of 5 volts and is also applied to the input terminal of the nth Remux 14 which contains an input buffer stage, not shown. This will cause the input to be at a Logic 1 during its normally-open configuration. When the switch 50 is actuated by an external actuation force, as by means of an operator's finger, the circuit to ground will be closed and the input signal extended to the input of the nth Remux 14 will appear as a Logic 0 for the respective switch. Thus the presence of a Logic 0 at a particular input to a Remux 14 is indicative of actuation of the respective switch and conversely, a Logic 1 is indicative of the absence of such actuation. Although not specifically illustrated, it will be understood that switches 51, 52, 54 and 56 are configured identically with switch 50 and also include a respective input buffer resistor. It will be understood that a respective input buffer is in the Remux 14. Each of the switches 50, 51, 52, 54 and 56 is of the so-called "dry" contact type and is relatively simple in construction, is physically small and need only handle low current signals.

Figure 2:
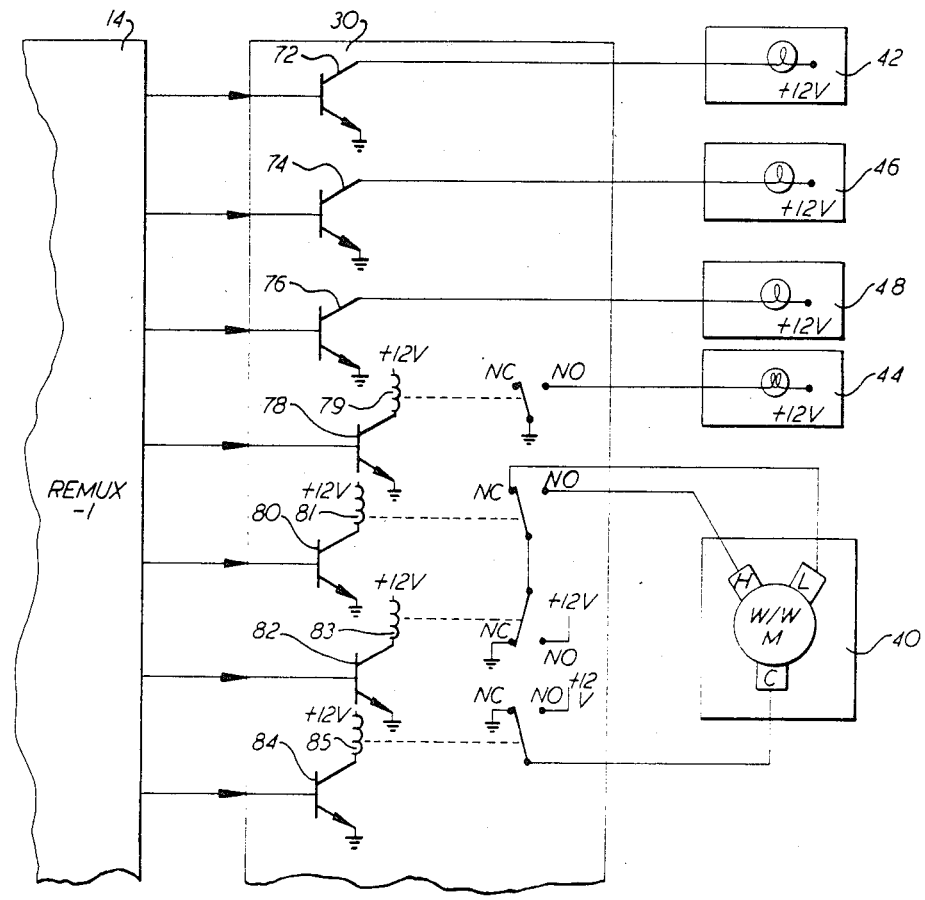
FIG. 2 is a circuit diagram of a portion of the diagram of FIG. 1 illustrating the load circuitry in greater detail.

Referring to FIG. 2 there is illustrated a representative output from Remux 14 to the several previously identified loads 40, 42, 44, 46, and 48. It will be appreciated that other loads, though not shown, might also be included. The instrument panel (IP) lamp 42 is illustrated as a single low current lamp, however, it will be appreciated that more than one instrument panel lamp might be connected in parallel therewith. The panel lamp 42 provides illumination or back lighting and utilizes an NPN transistor 72 having its base connected to an output of Remux 14 for controlling current conduction through the lamp. Specifically, when the output of Remux 14 connected to transistor 72 is at a Logic 0, the transistor is substantially nonconducting and lamp 42 is off. Conversely, when Remux 14 provides a Logic 1 at its output, transistor 72 conducts and the lamp 42 will be energized and emit light.

Lamps 46 and 48 represent the "left" turn and the "right" turn direction indicators respectively.

As with the panel lamp 42, the left turn and right turn lamps 46 and 48 are driven by NPN transistors 74 and 76, respectively. To obtain the well-known flashing effect at either of lamps 46 or 48, the programming of Mux computer 12 causes the respective output of the Remux 14 to vary between a Logic 1 and a Logic 0 at the requisite flashing rate.

The headlights are represented by a lamp 44 which is controlled via a transistor 78 connected to an output of Remux 14. The transistor 78 is depicted as controlling energization of a relay coil 79 for moving a single pole, double throw relay from its normally-closed to its normally-open position to provide a conductive path through the headlamp 44. It will be understood that the foregoing depiction of individual lamps 44, 46, and 48 is intended to represent one or more similar lamps connected in parallel.

The windshield wiper motor 40 includes both a low speed armature, designated L and a high speed armature, designated H, for low speed and high speed operation respectively. The wiper motor 40 operates in a known manner to drive a pair of windshield wipers bidirectionally. Three NPN transistors 80, 82 and 84 have their bases connected to respective outputs of Remux 14 and include respective relay coils 81, 83 and 85 connected in their respective collector circuits for controlling energization of three respective pairs of single pole, double throw relay contacts. Specifically, when the base of transistor 84 is at a Logic 0 and relay coil 85 is not energized, the common terminal C of motor 40 will be connected to ground, thus preventing the application of an operating potential across the motor. On the other hand, when the base of transistor 84 goes to a Logic 1 and the relay coil 85 is energized, the relay will apply a 12 volt potential to the common terminal C of motor 40 and the particular speed of operation will depend upon which of the two armature terminals, L or H, provides a completed circuit to ground. When relay coil 81 is not energized, the relay is normally closed and the motor will operate in its low speed mode. Conversely, when relay 81 is energized by application of a Logic 1 to the transistor 80, the circuit is completed through armature H of motor 40 to provide high speed operation. The foregoing description applies to unidirectional operation, however, because the motor is to be operated bidirectionally it is necessary to reverse the polarity of the potential applied to whichever speed armature is being used. Accordingly, to reverse the direction of the applied potential, the relay 85 is deenergized such that the common terminal C on motor 40 is at ground and the relay 83 is energized to apply a 12 volt potential to the appropriate H or L armature. This repetitive process is controlled in a known manner by sensing the limits of the wiper sweep.

Although each of the driver elements in the buffer 30 were depicted in FIG. 2 as including a conventional NPN transistor and possibly also a relay, it will be understood that other buffering devices might be substituted. Typically, the buffering element or circuit used will be determined by the maximum current drain of the respective load and by system economics. In some instances a simple transistor will suffice, in other instances a transistor will be utilized to drive the coil of a relay which in turn controls various conductive paths. Still further, semi-conductors of increased current carrying capacity might be utilized, as for instance, power FETs.

Figure 3:
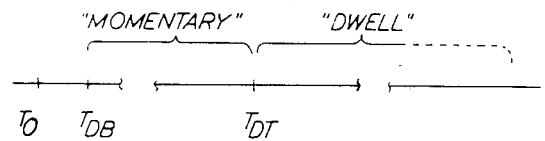
FIG. 3 is a timing diagram illustrating the timing of the several events associated with input switch control action.
Figure 4B:
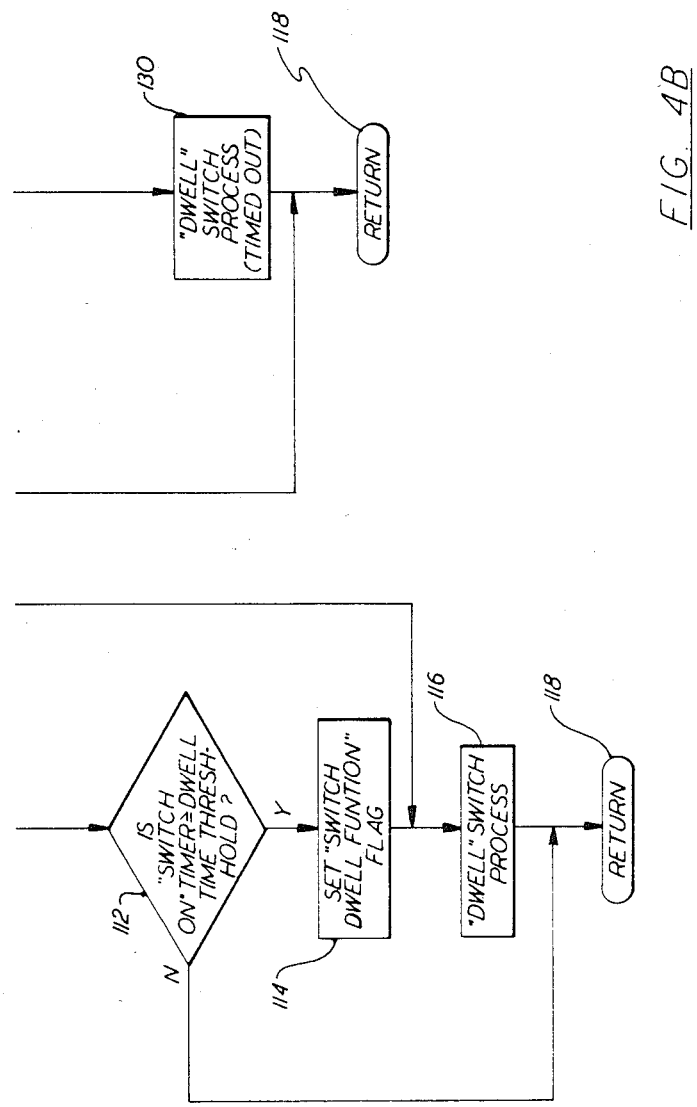
FIG. 4 is a flow diagram of the decision and control routine associated with recognizing switch actuation and determining whether it signifies a primary or a secondary mode control process.

Referring to FIGS. 3 and 4, a principal aspect of the invention is graphically and pictorially illustrated. Specifically, the structure and programming of the microcomputer control circuitry 10 is such that each of the switches 50, 51, 52, 54 and 56 is monitored at its respective input port to the Remux 14 to determine firstly whether or not it has been actuated and secondly, if it has been actuated, whether or not such actuation persists for longer than some predetermined threshold interval. In the event of switch actuation of less than that threshold interval, such actuation is characterized as "momentary" switch action and is effective to provide a first mode of load control. On the other hand, if the duration of switch actuation exceeds the threshold, it will be operative to effect a secondary mode of load control characterized as "dwell" switch action.

In FIG. 3 there is illustrated a timing diagram in which $T_0$ represents the instant of earliest possible switch actuation, $T_{DB}$ represents a predetermined brief interval for debouncing the switch signal, $T_{DT}$ represents the end of the predetermined interval following either $T_0$ or $T_{DB}$ during which completion of switch actuation is indicative of "momentary" action for effecting primary load control. The interval following $T_{DT}$ and until termination of switch actuation is used to effect "dwell" switch operation in the secondary mode of load control and includes a characteristic of load control which is dependent upon the dwell time following $T_{DT}$.

The input ports to Remux 14 into which the several switches 50, 51, 52, 54 and 56 are connected are repetitively scanned at brief intervals to determine whether or not a respective switch is actuated. Most of the input switches are connected to Remux input ports which include debounce circuitry described in greater detail in the aforementioned Application Ser. No. 540,581 to Floyd et al. Typically the debounce interval is less than the scanning frequency at the input port of the Remux and may typically be on the order of 5 milliseconds. Certain of the input switches may control so-called "essential" functions which require a brief latching by an appropriate latching circuit also in accordance with the aforementioned Application Ser. No. 540,581. In either instance, the debounce interval is typically less than 10 milliseconds. The "momentary" switch interval exists for any sensed switch actuation which may be initiated substantially at time $T_0$ and lasts through the brief debounce interval and which terminates before the dwell threshold $T_{DT}$. The dwell threshold $T_{DT}$ is selected to satisfy ergonomic considerations which include human response times for momentary actuation of a switch and the attendant mechanical response time of the particular switch. Accordingly, $T_{DT}$ should preferably be selected to have a value within the range of 500 milliseconds to one second and in the illustrated embodiment is about 750 milliseconds after $T_0$ or $T_{DB}$. Beyond the dwell time threshold $T_{DT}$, it will be appreciated that the operator may dwell on the switch for an indefinite length of time, however the attendant circuitry may in some instances provide a maximum to the time-dependent response in the secondary mode of load control.

The response of the microcomputer, and specifically the Mux 12 to a switch input is depicted in the flow diagram of FIG. 4. The input port is repetitively scanned at about 20 millisecond intervals to determine at block 100 if the "INPUT SWITCH" is "ON". Assuming there is an input signal, the next block 102 asks if the "INPUT SWITCH" flag was set and if not, it sets the "INPUT SWITCH" flag at 104 and starts the "SWITCH ON" timer at 106 and resets the "SWITCH DWELL FUNCTION" flag at 108. Next, block 110 asks if the "SWITCH DWELL FUNCTION" flag is set. This question is asked directly from block 102 if the answer there had been "yes". If the "SWITCH DWELL FUNCTION" flag is not set, block 112 asks if "SWITCH ON" timer is equal to or greater than the dwell time threshold $T_{DT}$. If it is, block 114 sets the "SWITCH DWELL FUNCTION" flag and the control moves to the "DWELL" switch process at block 116 and then Returns at 118 to the Start. If the "SWITCH ON TIMER" was less than $T_{DT}$ at 112, the routine goes directly to the Return at 118. If the "SWITCH DWELL FUNCTION" flag had been set at 110, the routine would have jumped to the "DWELL" switch process at 116.

If the input switch were not "ON" at 100, block 120 asks if the "INPUT SWITCH" flag is set and if it is not, the routine assumes "NO SWITCH ACTION" (no actuation) at block 122 and moves to Return 118. However, if the "INPUT SWITCH" flag were set at 120, the "INPUT SWITCH" flag is reset at 124 and block 126 asks if the "SWITCH DWELL FUNCTION" flag is set. If it is set, block 128 resets the "SWITCH DWELL FUNCTION" flag and block 130 notes that the "DWELL" SWITCH PROCESS has timed out or completed, as by the actuating force having been removed from the respective input switch, and the routine Returns at 118. It should be noted that the "DWELL" SWITCH PROCESS mentioned in block 116 denotes those actions occurring while the switch is depressed, whereas the "DWELL" SWITCH PROCESS of block 130 represents those actions occurring when the switch is released and as a result of the action during block 116. Had the "SWITCH DWELL FUNCTION" flag not been set at 126, the routine would have moved to the "MOMENTARY" SWITCH ACTION process at block 132 and then to Return 118. It will be noted that the "MOMENTARY" PROCESS at block 132 does not begin until the switch is released.

The foregoing describes the general routine for determining whether primary or secondary mode control action is commanded by the input switch actuation. If primary mode control is commanded by "momentary" switch action, the computer responds by toggling or switching the operation of a respective load from one operating state to another in accordance with a predetermined sequence. In some instances there will be only two operating states, i.e., "off" and "on" or "low speed" and "high speed". Successive "momentary" actuations of direction light switches 54 and 56 and illumination switch 52 command such actions.

In other instances there may be several such states, as for instance "on", "low speed" and "high speed", as in the instance of switch 50 which controls the wiper motor 40. In that case, a momentary actuation of switch 50 when motor 40 is "off" has the effect of turning it on to low speed. This response is obtained by a Logic 1 appearing at that output of Remux 14 going to transistor 60. The next momentary actuation of switch 50 provides a Logic 1 to transistor 80 and switches motor 40 to high speed. All subsequent momentary actuations of switch 50 serve to alternate the motor between low and high speed. To turn motor 40 off, activation of switch 51 is required. It should be mentioned that switch 51 is only intended to provide a single mode of load control and thus, the computer does not make the "momentary" versus "dwell" analysis for it.

Assuming an input switch is maintained actuated beyond the dwell threshold time $T_{DT}$, no "momentary" or primary mode action is taken but instead the control of the respective load, or loads, enters the secondary or "dwell" mode. In this mode the control action is a function of the dwell time on the switch following the dwell threshold $T_{DT}$. In one of the simpler instances, that of the direction switches 54 or 56 and their lamps 46 or 48, the dwell mode services to keep the direction lamps actuated or flashing while the switch is actuated and terminates when it is released. This affords a signaling capability for lane changing, and is cancelled simply by releasing the switch which causes the process to "time out" or terminate at block 130 of FIG. 4.

Figure 5:
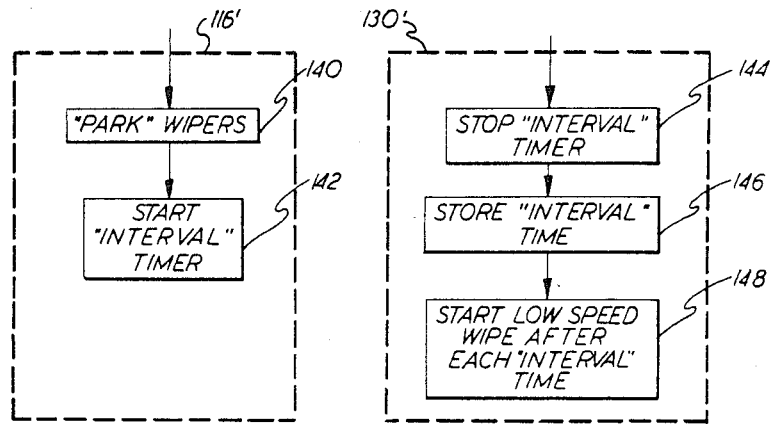
FIG. 5 is a flow diagram of the decision and control routine for intermittent windshield wiper operation in accordance with the switch dwell process.

A flow diagram of the "DWELL" switch process routines 116' and 130' for the wiper motor 40 is depicted in FIG. 5. Firstly, the wipers are held at a parked position, as represented by block 140, and an "INTERVAL" timer is started at 142 to begin accumulating a count representative of a delay interval between successive sweeps of the wiper. The "INTERVAL" timer accumulates an interval time count which corresponds with the real time duration of actuation of the input switch up to some predetermined maximum, as for instance 15 seconds. When the switch is released, the routine enters the Dwell Switch Process block 130', stopping the "INTERVAL" timer at block 144, then storing the "INTERVAL" time at block 146 and finally, at block 148, starting low speed intermittent operation of the wipers. The interval between each sweep of the wipers during intermittent operation is determined by the stored "INTERVAL" time and may range up to 15 seconds.

Attention is now given to the control of the intensity of the instrument panel (IP) illumination lamps 42 via the "DWELL" control mode of the respective input switch 52. Such control may be referred to as a "dimmer" or a "brightness control". It will be understood that a momentary action on that switch 52 is operative to switch both the headlamps 44 and the IP lamps 42 from an "off" condition to an "on" condition. "DWELL" actuation on switch 52 serves in each of two embodiments to control the intensity of the IP lighting, as will be hereinafter explained. In either event, the intensity of the IP lamps 42 is controlled by varying the duty cycle of a Logic signal appearing at the output of Remux 14 and applied to the base of transistor 72. The duty cycle is varied by pulse-width modulation.

Figure 6:
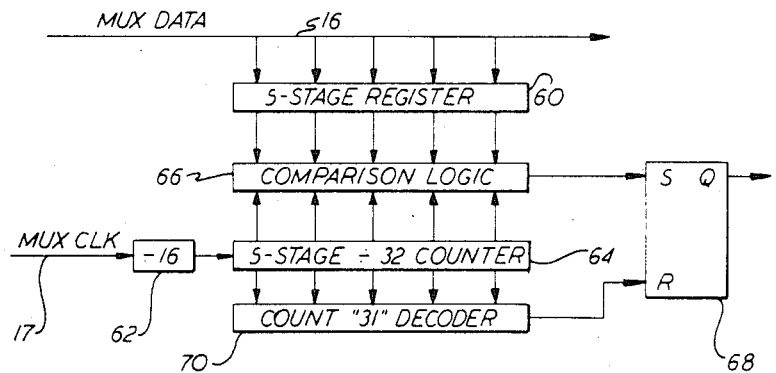
FIG. 6 is a generalized block diagram of pulse-width modulation circuitry for controlling lamp intensity.

Referring to FIG. 6 there is illustrated a generalized block diagram of pulse-width modulation circuitry incorporated in each of the Remuxes 14 for effecting the requisite pulse-width modulation as a function of an intensity-level number developed and stored in Mux computer 12. Broadly, a Remux 14 includes a five stage register 60. The five bit output of a five stage intensity-level counter or timer in the Mux computer 12 is delivered via Mux data line 16 and entered in parallel into the five stages of register 60. Similarly, a MUX CLK signal is provided on line 17 to drive a ÷ 16 counter 62, which in turn drives a five stage, ÷ 32 counter 64. That counter 64 cycles through a 32-count cycle from 0 to 31. Assuming some count between 0 and 31 is entered into register 60 when counter 64 begins counting, the count in counter 64 will reach a point of equality with the count stored in register 60 sometime during its cycle. This equality is recognized by appropriate comparison Logic 66 which sets a flip-flop 68 such that its Q output goes to a Logic 1. The outputs of the ÷ 32 counter 64 are decoded by a decoder 70 such that at each count of "31", the flip-flop 68 is reset, thus causing the Q output to go to a Logic 0.

Figure 7A:
FIGS. 7A and 7B respectively illustrate pulse-width modulated control signals of 25% and 75% duty cycles respectively.
Figure 7B:
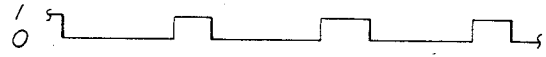

Referring to FIG. 7A, the logic level of the Q output of flip-flop 68 is depicted to illustrate the effect of loading a count of "7" into the register 60, such that the Q output of flip-flop 68 goes to a Logic 1 when the counter 64 has completed 25% of its count and remains there for the final 75%. Correspondingly, FIG. 7B illustrates the effect of loading a count of 23 into the register 60 such that the Q output of flip-flop 68 goes to a Logic 1 only for the final 25% of the cycle of counter 64. The frequency of MUX CLK 17 and the number of counting stages in counters 62 and 64 provide 50 Hz waveforms in FIGS. 7A and 7B. It will be understood that as the duty cycle increases, the intensity or brightness of IP lamps 42 also increase, and vice versa.

Figure 8:
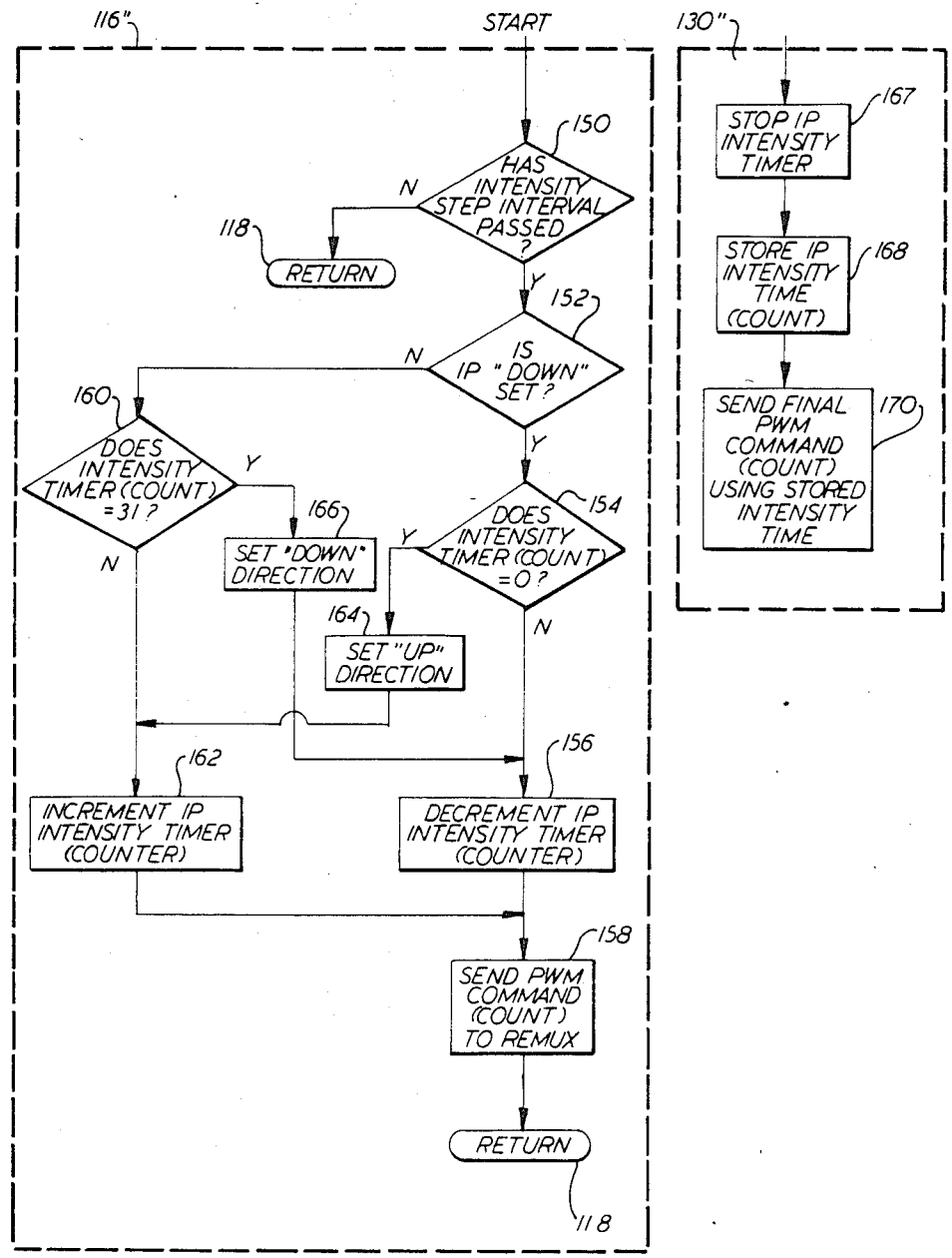
FIG. 8 is a flow diagram of the decision and control routine of a first embodiment for varying lamp intensity in accordance with the switch dwell process.

A flow diagram of the "DWELL" SWITCH PROCESS routines 116'' and 130'' for the instrument panel (IP) lamps 42 is depicted in FIG. 8. As mentioned, an intensity timer or counter is contained in the programming of Mux computer 12 and it is stepped to effect an increase or decrease in lamp intensity. Typically, it is desired to step the IP INTENSITY timer, and thus the actual lamp intensity, only approximately each half second. Therefore, referring first to the process 116'', the first action is to determine at block 150 whether the requisite INTENSITY STEP INTERVAL has passed. If it has not, you Return in the routine. If the STEP INTERVAL has passed, a determination is made at block 152 whether or not an IP "DOWN" flag is set. Assuming the "DOWN" flag was set, indicating a dimming operation, a determination is made at block 154 whether or not the count of the INTENSITY timer equals zero. Assuming it does not equal zero, the IP INTENSITY timer is decremented at block 156 and a pulse-width modulation (PWM) COMMAND is sent to a relevant Remux 14, as represented by block 158. It will be appreciated that this function and data correspond with the loading of a five-bit number into the five-stage register 60 of FIG. 6. The routine then Returns to the start.

If at block 152 it had been determined that the DOWN direction was not set, or in other words an UP direction was set, the routine branches to block 160 which determines whether or not the count on the IP INTENSITY timer equals "31", a maximum. If it has not, the IP INTENSITY timer is incremented at block 162 and a PWM COMMAND is sent at block 158 to the Remux 14 and the routine Returns at 118.

If at block 154 the IP INTENSITY counter had reached its lower limit of zero, the routine branches to block 164 to set the UP direction flag and thence to blocks 162 and 158 to increase the intensity as described above. Conversely, if at block 160 the IP INTENSITY counter had reached its upper limit of "31", the routine branches to block 166 to set the DOWN direction flag and thence to blocks 156 and 158 to decrease the intensity as described above. Thus it will be appreciated that so long as the switch 52 is maintained in the DWELL mode, the intensity of the IP lamps 42 will continue to cycle between the maximum and minimum limits.

Referring to the process block 130″ of FIG. 8, when switch 52 is released, the IP INTENSITY timer will be stopped, as represented by block 167 and the IP INTENSITY count will be stored, as represented by block 168. The Mux computer 12 will then send a final PWM COMMAND count using the stored IP INTENSITY count, as represented by block 170. Thereafter, the Remux 14 stores that count in register 60 to maintain desired intensity.

Figure 9B:
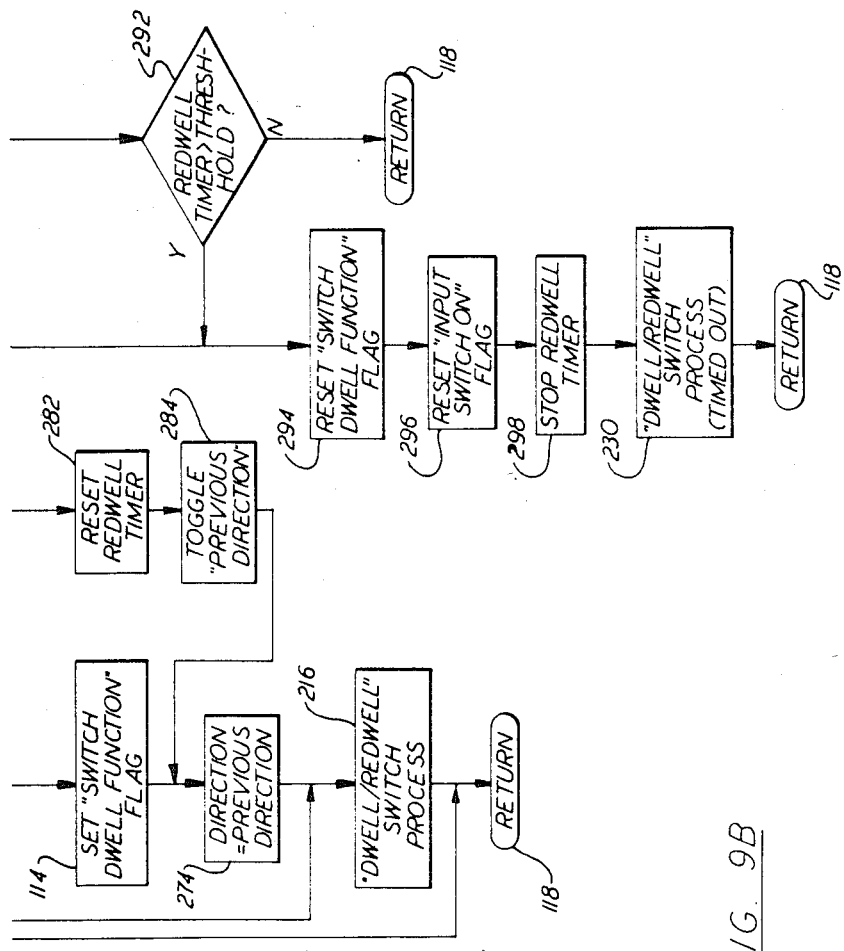
FIG. 9 is a flow diagram of the decision and control routine of a second embodiment for controlling lamp intensity in accordance with the switch dwell process.

The flow diagram depicted in FIG. 9 is concerned with an alternative routine for establishing the brightness level of the IP lamps 42. Specifically, the "dwell" switch mode is divided into plural, discretely separate but closely-spaced dwell intervals. Each such dwell interval is operative to step the intensity counter in only one direction, with successive such "dwell" intervals serving to step the intensity counter in respectively opposite directions. For instance, during a first dwell the intensity counter may begin to increment, thereby increasing the intensity of lamps 42 from their starting level. If, however, it is desired to decrease the intensity of the lamps, the operator briefly releases switch 52 and promptly reactuates it to initiate a second "dwell" or so-called "redwell", which serves to decrement the intensity counter and decrease the lamp intensity.

Referring to FIG. 9, much of the depicted routine is the same as or similar to the basic routine depicted in FIG. 4. Accordingly, those decisions or functions of the routine of FIG. 9 which are the same, or substantially the same, as in FIG. 4 are numbered identically therewith and little or no additional description should be required. The branch including blocks 104, 106, and 108 begins the initial timing of switch actuation. Once the INPUT SWITCH flag is seen to be set at 102, but the REDWELL flag is not set at 272, the routine pursues a branch which includes blocks 110, 112 and 114 previously described. Once the SWITCH DWELL FUNCTION flag is set at 114, block 274 determines that the direction in which the IP INTENSITY counter steps is the same direction as it previously stepped. Then the routine enters the DWELL/REDWELL SWITCH PROCESS block 216 which practices the functions of either blocks 150, 152, 154, 156 and 158 or blocks 150, 152, 160, 162 and 158 respectively of FIG. 8, depending on the "direction" (UP or DOWN) established by block 274.

Assuming the switch is released and is quickly reactuated to establish a valid "redwell" condition, the initial interruption of switch actuation passes through blocks 100, 120 and 126 to block 288 which sets a SWITCH REDWELL flag and resets the SWITCH ON timer. The REDWELL timer is then started at block 290, and block 292 determines whether or not the count on the REDWELL timer is greater than some threshold. That threshold is long enough to allow some brief time separation but short enough to identify the next "dwell" as a "redwell" if that was intended. Typically that threshold will be in the range of 0.5–1 second. Assuming the REDWELL count is less than the threshold and the switch is reactuated, the routine passes through blocks 272 and 276 to the function blocks 280, 282 and 284. Blocks 280, 282 and 284 respectively provide for the SWITCH REDWELL flag to be reset, for the REDWELL timer to be reset and for the value (1 or 0) representative of the PREVIOUS DIRECTION (UP or DOWN) in block 274 to be toggled. This latter function results in the IP INTENSITY counter stepping in the opposite direction from the previous "dwell" or "redwell" interval.

If the switch were not reactuated in sufficient time for a "redwell" function, this would be indicated by either block 276 or 292 and action would be taken via function blocks 294, 296 and 298 to reset the SWITCH DWELL FUNCTION flag, to reset the INPUT SWITCH ON flag and to stop the REDWELL timer. Then the routine would enter the DWELL/REDWELL SWITCH PROCESS (Timed Out) block 230 which is functionally identical to block 130″ of FIG. 8.

The MOMENTARY SWITCH PROCESS of block 132 is entered only prior to the first "dwell" function because the DWELL FUNCTION flag is set thereafter and preparatory to a "redwell" function. The INPUT SWITCH ON flag is reset in that branch by block 286.

Although this invention has been shown and described with respect to detailed embodiments thereof, it will be understood by those skilled in the art that various changes in form and detail thereof may be made without departing from the spirit and scope of the claimed invention.

Having thus described a typical embodiment of our invention, that which is claimed as new and desired to secure by Letters Patent of the United States is:

1. A control circuit for selectively determining multiple modes of operation for one or more electrical loads in an automotive accessory system, the circuit comprising:

for a said load, a respective momentary action switch operatively associated with a signal potential and being responsive to an actuating force to provide a signal indicative of switch actuation only while said actuating force persists;

microcomputer control means;

means for extending said signal indicative of switch actuation to said microcomputer control means; and wherein said microcomputer control means repetitively, at brief intervals, determines the presence or absence of said actuation signal of a respective said switch and the duration of a said switch actuation signal, while present, relative to a predetermined time threshold and is operative following a determination that said switch actuation signal was present only for a momentary interval less than said predetermined threshold to effect control of a said load in a primary mode and is operative following a determination that said switch actuation signal was present for a dwell interval longer than said predetermined threshold to effect control of a said load in a secondary mode.

2. The control circuit of claim 1 wherein said secondary mode of load control effects operation of the load as a function of the duration of said dwell interval following said time threshold.

3. The control circuit of claim 2 wherein said primary mode of load control effects operation of the load in alternate ones of only several operating states, and said microcomputer control means is responsive to successive momentary actuations of said switch to effect operation of said load in alternate ones of said operating states in accordance with a predetermined sequence logic.

4. The control circuit of claim 3 wherein said primary mode of load control effects operation of the load in alternate ones of only two operating states, and said microcomputer control means is responsive to successive momentary actuations of said switch to effect operation of said load in respective opposite ones of said two operating states.

5. The control circuit of claim 1 wherein said primary mode of load control is effected only after said switch actuation signal is determined to be no longer present.

6. The control circuit of claim 1 wherein said loads are plural and are functionally diverse, a separate said switch being provided to control each of said functionally-diverse loads.

7. The control circuit of claim 6 wherein the respective said plural loads include a windshield wiper motor and turn indicating lamp means.

8. The control circuit of claim 7 wherein said plural loads further include illumination means.

9. The control circuit of claim 1 wherein one said load includes a multiple speed windshield wiper motor and wherein the respective said primary mode of load control includes selection of a respective one of the multiple speeds of wiper motor operation and wherein the respective said secondary mode of load control comprises intermittent operation of the wiper motor at selectable sweep intervals, the period of said sweep intervals being determined by and substantially proportional to the duration of the dwell interval of the respective said switch actuation signal following said time threshold and within a predetermined maximum sweep interval limit.

10. The control circuit of claim 9 wherein said primary mode of load control provides selection of low speed wiper motor operation if in a wiper motor "off" condition, high speed operation of the wiper motor if the wiper motor is operating in a "low" speed and low speed operation of the wiper motor if the wiper motor is operating in a "high" speed.

11. The control circuit of claim 10 including a further switch operatively connected to said microcomputer control means for providing a respective input signal thereto, said microcomputer control means being responsive to said further switch input signal to place said wiper motor in the off condition.

12. The control circuit of claim 1 wherein one said load includes illumination means and wherein the respective said primary mode of load control includes selection of either an "on" or an "off" condition of said illumination means and wherein the respective said secondary mode of load control comprises variability of the brightness of said illumination means, the brightness of said illumination means being a variable and being determined by the duration of the dwell interval of the respective said switch actuation signal following said time threshold and within a predetermined range of brightness variation.

13. The control circuit of claim 12 wherein said variation in the brightness of said illumination means is first in a predetermined one of two directions, increasing and decreasing, until reaching a limit of said range of brightness variation and then in the other of said two directions.

14. The control circuit of claim 12 wherein said variation in the brightness of said illumination means is in only one of two directions, increasing or decreasing, throughout the dwell interval of the respective said switch actuation signal and wherein said microcomputer control means is responsive to the next subsequent discrete dwell interval of the respective said switch actuation signal occurring within a brief interval after the preceding dwell interval to vary the brightness of said illumination means in the other of said two directions.

15. The control circuit of claim 12 wherein said illumination means comprise instrument panel lighting means.

16. The control circuit of claim 1 wherein said repetitive brief interval at which the presence or absence of said switch actuation signal is determined is less than about 10 milliseconds, and said time threshold follows by a predetermined interval the initial determination that said switch actuation signal was present, said predetermined interval for said time threshold being preselected to satisfy ergonomic criteria and being in the range of about 500 milliseconds to one second.

* * * * *